(12) United States Patent
Mitsumoto et al.

(10) Patent No.: US 8,393,370 B2
(45) Date of Patent: Mar. 12, 2013

(54) SUBSTRATE LAMINATING APPARATUS

(75) Inventors: Masaru Mitsumoto, Matsudo (JP);
Shigeo Watanabe, Kudamatsu (JP);
Tatsuhito Kunihiro, Hikari (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 876 days.

(21) Appl. No.: 11/782,014

(22) Filed: Jul. 24, 2007

(65) Prior Publication Data

US 2008/0017322 A1 Jan. 24, 2008

(30) Foreign Application Priority Data

Jul. 24, 2006 (JP) ................................. 2006-200172

(51) Int. Cl.
*B29C 65/00* (2006.01)
(52) U.S. Cl. ........ 156/381; 156/382; 156/580; 414/217; 414/222.01; 414/222.09; 414/222.12; 269/20; 269/21
(58) Field of Classification Search .................. 156/285, 156/286, 381, 382, 580; 269/20, 21; 414/217, 414/222.01, 222.09, 222.12
See application file for complete search history.

(56) References Cited

U.S. PATENT DOCUMENTS

| | | | | |
|---|---|---|---|---|
| 5,223,001 A | * | 6/1993 | Saeki | 29/25.01 |
| 2002/0062787 A1 | * | 5/2002 | Hashizume et al. | 118/664 |
| 2003/0178134 A1 | * | 9/2003 | Muramoto et al. | 156/285 |
| 2005/0095089 A1 | * | 5/2005 | Hur et al. | 414/217 |

FOREIGN PATENT DOCUMENTS

JP 2001-305563 10/2001

OTHER PUBLICATIONS

Japanese Office Action Appln. No. 2006-200172 dated Jul. 27, 2010.

* cited by examiner

*Primary Examiner* — Christopher Schatz
(74) *Attorney, Agent, or Firm* — Antonelli, Terry, Stout & Kraus, LLP.

(57) ABSTRACT

A substrate laminating apparatus which sticks substrates together in vacuum with high accuracy. The apparatus includes a first chamber into which two substrates are carried; a second chamber in which substrates are stuck together; and a third chamber which delivers a substrate laminate. The pressure level in the first chamber and the third chamber is varied from atmospheric to medium vacuum under control and that in the second chamber is varied from medium vacuum to high vacuum under control. In the second chamber, electrostatic adsorption means which can move up and down picks up an upper substrate and holds it on an upper table.

6 Claims, 5 Drawing Sheets

SUBSTRATE LAMINATING APPARATUS

BACKGROUND OF THE INVENTION (1) Field of the Invention

The present invention relates to a substrate laminating apparatus and more particularly to a substrate laminating apparatus suitable for assembling a liquid crystal display panel in which substrates to be laminated are held in a vacuum chamber facing each other and laminated with a narrow spacing between them.

(2) Description of the Related Art

The manufacture of liquid crystal display panels includes a process in which two glass substrates with transparent electrodes and thin-film transistor arrays are stuck together with a very small spacing of several micrometers or so between them using an adhesive agent (hereinafter sometimes called sealant) put on a substrate peripheral area (a finished substrate laminate will be hereinafter called a cell) and liquid crystal is sealed into the space thus made.

One existing technique of sealing liquid crystal in this process is as follows: liquid crystal is dropped on one substrate with a closed pattern of sealant drawn thereon without any injection hole and one substrate is positioned over the other substrate in a vacuum chamber and the upper and lower substrates are brought closer to each other and stuck together. Japanese Patent Application Laid-open Publication No. 2001-305563 discloses a technique whereby a preliminary chamber for carrying a substrate into, and out of, the vacuum chamber is provided and a substrate is carried in and out while the vacuum chamber's atmosphere is the same as the preliminary chamber's.

The above conventional technique causes the following bottleneck in efforts to increase productivity: it takes time to change the pressure level in the vacuum chamber from atmospheric to vacuum in order to make the preliminary chamber and the vacuum chamber have the same atmosphere when a substrate is carried in or out. Particularly, when two substrates are carried into the preliminary chamber and then from the preliminary chamber into the laminating chamber, the zone from the preliminary chamber to the laminating chamber must have an atmospheric pressure because the substrates are carried one by one. In the technique disclosed by Japanese Patent Application Laid-open Publication No. 2001-305563, since substrates are placed on rollers for transportation, they may be damaged or generate dust due to a friction caused by their movement on the rollers. Furthermore, in order to hold an upper substrate on a pressure plate in the laminating chamber, the upper substrate is picked up by suction and adsorption means, then held on a table surface by an electrostatic adsorptive force. Since two adsorption means are used, a complicated pressure plate structure is needed; also since the substrate may come off the pressure plate when the suction and adsorption mode is switched to the electrostatic adsorption mode or vice versa, a means for receiving the substrate must be installed.

Therefore, an object of the present invention is to provide a highly productive substrate laminating apparatus which has means to pick up an upper substrate from a robot hand in vacuum reliably and hold it on an upper table surface and thereby performs lamination of substrates with high accuracy quickly.

SUMMARY OF THE INVENTION

In order to achieve the above object, an apparatus according to the present invention is characterized in that an upper table in a second chamber has electrostatic adsorption means which can move up and down and when a substrate is picked up from a robot hand, the electrostatic adsorption means is moved down from the table surface to touch the substrate surface on the robot hand and the electrostatic adsorption means is turned on to hold the substrate, then moved up to the upper table surface to keep holding the substrate. In addition, the apparatus includes a first chamber into which two substrates are carried; a second chamber in which substrates are laminated, or stuck together; and a third chamber which delivers a substrate laminate. The pressure level in the first chamber and the third chamber is varied from atmospheric to medium vacuum under control and that in the second chamber is varied from medium vacuum to high vacuum under control.

In the substrate laminating apparatus according to the present invention, an upper substrate is picked up and held on the upper table reliably in medium vacuum and evacuation time to decrease the pressure from atmospheric pressure to high vacuum, which accounts for the largest percentage of laminating time, is shortened and lamination of substrates is carried out in vacuum with high accuracy.

BRIEF DESCRIPTION OF THE DRAWINGS

The invention will be more particularly described with reference to the accompanying drawings, in which.

DETAILED DESCRIPTION OF THE PREFERRED EMBODIMENT

Figure 1:
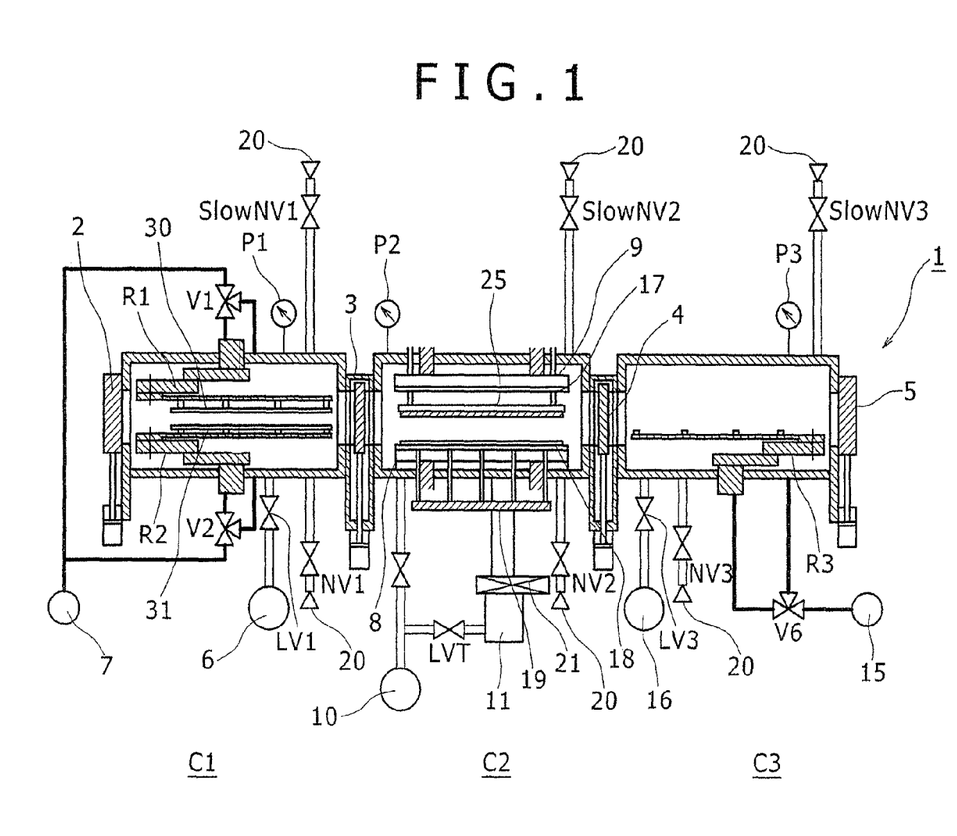
FIG. 1 is a sectional view of a substrate laminating apparatus according to an embodiment of the present invention.

Next, a preferred embodiment of the present invention will be described referring to the accompanying drawings. As shown in FIG. 1, a substrate laminating apparatus according to the present invention includes: a first chamber C1 into which an upper and a lower substrate are carried with sealant applied to either substrate and liquid crystal dropped on the lower substrate (sometimes called the substrate pre-treatment chamber or substrate input chamber); a second chamber C2 which serves as a vacuum laminating chamber where an upper and a lower substrate are stuck together; and a third chamber C3 (sometimes called the substrate post-treatment chamber or substrate delivery chamber) which delivers a substrate laminate (liquid crystal panel). In the first chamber C1, there are an upper substrate carrying robot hand R1 for carrying in an upper substrate 30 and a lower substrate carrying robot hand R2 for carrying in a lower substrate 31. In the third chamber C3, there is a delivery robot hand R3 for carrying out a finished laminate or liquid crystal panel. A first door valve 2 is located at the entry side of the first chamber C1 and a first gate valve 3 is located between the first chamber C1 and the second chamber C2. Similarly, a second gate valve 4 is located between the second chamber C2 and the third chamber C3 and a second door valve 5 is located at the exit side of the third chamber C3.

In addition, a vacuum pump 6 for depressurizing the first chamber C1, a vacuum pump 7 for supplying a negative pressure to the upper and lower substrate carrying robot hands R1 and R2 to hold substrates by suction and adsorption, and a nitrogen source 20 for supplying nitrogen as a purge gas to the first chamber C1 are connected. Valves (NV1 to NV3) are fitted to pipes for supplying nitrogen gas into the chambers.

A lower table 8 on which the lower substrate 31 is placed and an upper table 9 on which the upper substrate 30 is held by adsorption (pressure plate) are located in the second chamber C2. A vacuum pump 10 for evacuating the second chamber and a turbo molecular pump 11 are located outside the second chamber C2. A third gate valve 21 is located on the intake side of the turbo molecular pump 11.

Figure 2:
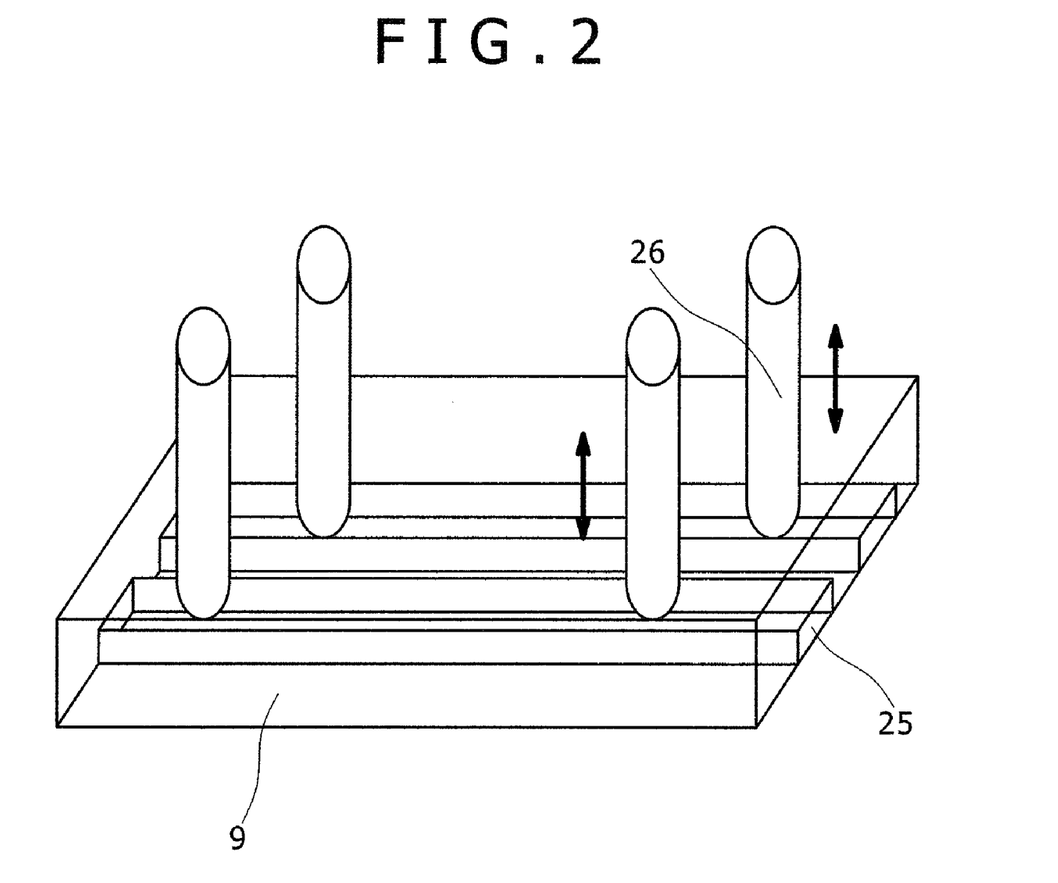
FIG. 2 schematically shows movable electrostatic adsorption means on an upper table.

As illustrated in FIG. 2, the upper table 9 has one or plural electrostatic adsorption means 25 with moving means which move up and down with respect to the table surface (movable electrostatic adsorption means). The movable electrostatic adsorption means 25 receives the upper substrate 30 from the upper substrate carrying robot hand R1 and moves it up to the upper table 9 surface. The adsorption surface of the electrostatic adsorption means 25 has a prescribed area so as to form an adsorption electrode. In this embodiment, it has almost the same length as the longitudinal size of the upper table 9 and a prescribed width. Therefore, the surface of the upper table 9 on which the upper substrate 30 is held has a recess to permit the electrostatic adsorption surface of the movable electrostatic adsorption means 25 to become flush with the upper table surface. Although not shown, a drive means for moving the electrostatic adsorption means 25 up and down is fitted to the tip of an arm 26 for supporting the electrostatic adsorption means 25. By activating the drive means, the electrostatic adsorption means 25 is made to protrude from the upper table 9 surface or return to its original position.

When the upper substrate 30 is carried from the upper substrate carrying robot hand R1 to the upper table 9, the electrostatic adsorption means 25 moves down until it touches the surface of the upper substrate 30 on the upper substrate carrying robot hand R1 and the electrostatic adsorption means 25 holds the upper substrate 30 by its electrostatic adsorptive force and moves up to the upper table 9 surface. In addition to the movable electrostatic adsorption means 25, a stationary electrostatic adsorption means or an adhesive adsorption means is fixed on the upper table surface, as a holding means 17 for fixing the upper substrate 30 on the upper table 9 surface. As the movable electrostatic adsorption means 25 ascends and the holding surface of the upper substrate 30 touches the upper table 9 surface, the stationary holding means 17 is activated to hold the upper substrate on the upper table surface firmly. The electrostatic adsorption means 25, intended to pick up an upper substrate, hardly discharges electricity even when the second chamber is at medium vacuum and there is a gap between the holding surface of the upper substrate 30 and the electrostatic adsorption means surface.

The lower table 8 is connected with a vacuum pump having plural suction/adsorption holes for receiving the lower substrate 31 and holding it temporarily. An electrostatic adsorption means or an adhesive adsorption means as a holding chuck 18 for fixing and holding a substrate in high vacuum is also provided. If the holding chuck 18 for the lower table 8 is designed to apply an adhesive force, such an adhesive force should be partially applied. Also, in order to receive the lower substrate 31 from the lower substrate carrying robot hand R2 and put a finished substrate laminate (liquid crystal panel) onto the delivery robot hand R3, the lower table 8 has a substrate lifter 19 with plural receiving claws to lift the liquid crystal panel (substrate laminate) from the lower table 8 surface and enable the delivery robot hand R3 to be inserted between the lower table 8 surface and the liquid crystal panel.

For the third chamber C3, a vacuum pump 15 and a vacuum pump 16 are provided where the vacuum pump 15 supplies a negative pressure to hold the substrate laminate on the delivery robot hand R3 by suction and adsorption in order to prevent it from getting out of place when delivering it and the vacuum pump 16 produces a negative pressure in the third chamber C3. Also, a nitrogen source 20 is connected to supply nitrogen as a purge gas to the third chamber C3.

For the first to third chambers, pressure gauges P1 to P3 are provided respectively. According to readings of these pressure gauges, the vacuum pumps, nitrogen supply valves, gate valves and so on are controlled to control the vacuum condition of each chamber.

In this embodiment, the second chamber C2, in which lamination takes place, is so controlled that a prescribed degree of vacuum (about 20 Kpa, hereinafter called medium vacuum) is kept while a substrate laminate is being carried out and then after an upper and a lower substrate to be laminated are carried therein, the second chamber C2 is returned to high vacuum (0.7 Pa). Thus, when the first gate valve 3 or second gate valve 4 is opened, the chamber is returned to the prescribed degree of vacuum. When the second chamber C2 returns from high vacuum to medium vacuum, the influence of moisture in the atmospheric air is eliminated by introduction of nitrogen for purging.

Since the degree of vacuum in each chamber is controlled as mentioned above, when a substrate is carried into the first chamber C1, obviously the prescribed degree of vacuum (medium vacuum) is kept and when it is carried from the first chamber C1 into the second chamber C2, the upper or lower substrate carrying robot hand can hold the upper or lower substrate by suction and adsorption.

Next, how the apparatus operates will be explained referring to the flowcharts of FIGS. 3, 4 and 5.

Figure 3:
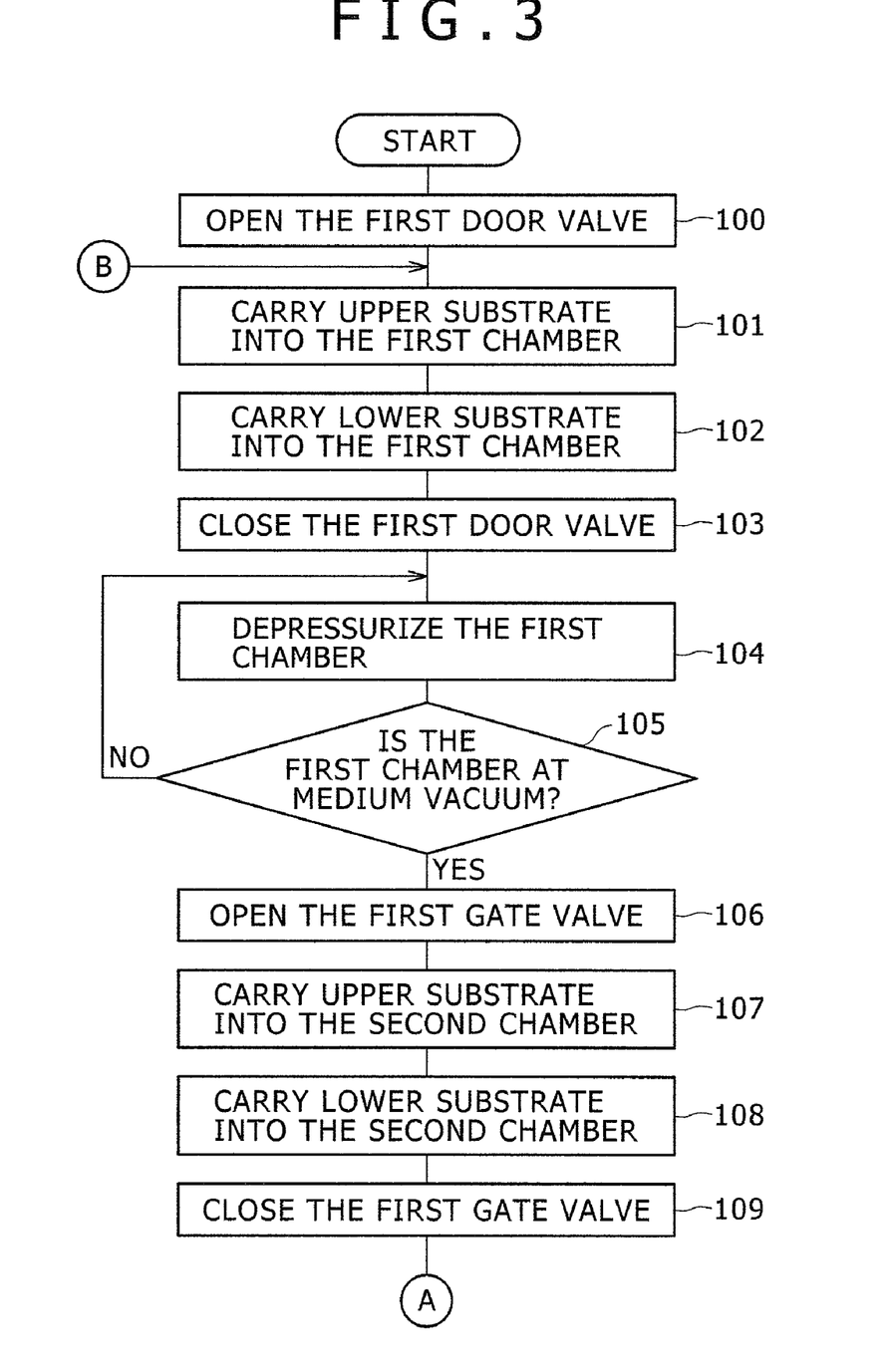
FIG. 3 is a flowchart which shows steps in the operation sequence of the substrate laminating apparatus shown in FIG. 1.
Figure 4:
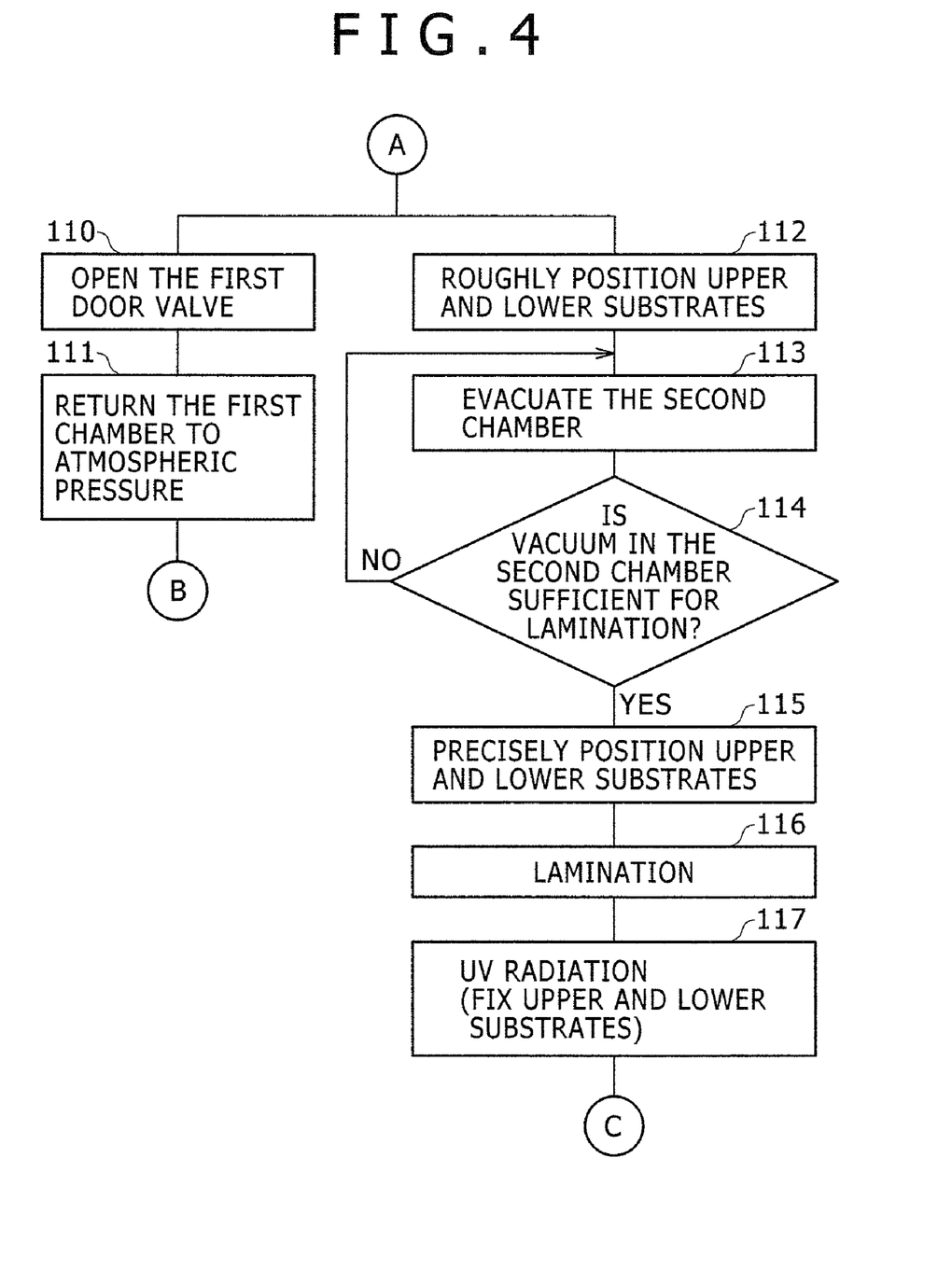
FIG. 4 is a flowchart which shows steps next to those in FIG. 3 in the operation sequence of the substrate laminating apparatus.
Figure 5:
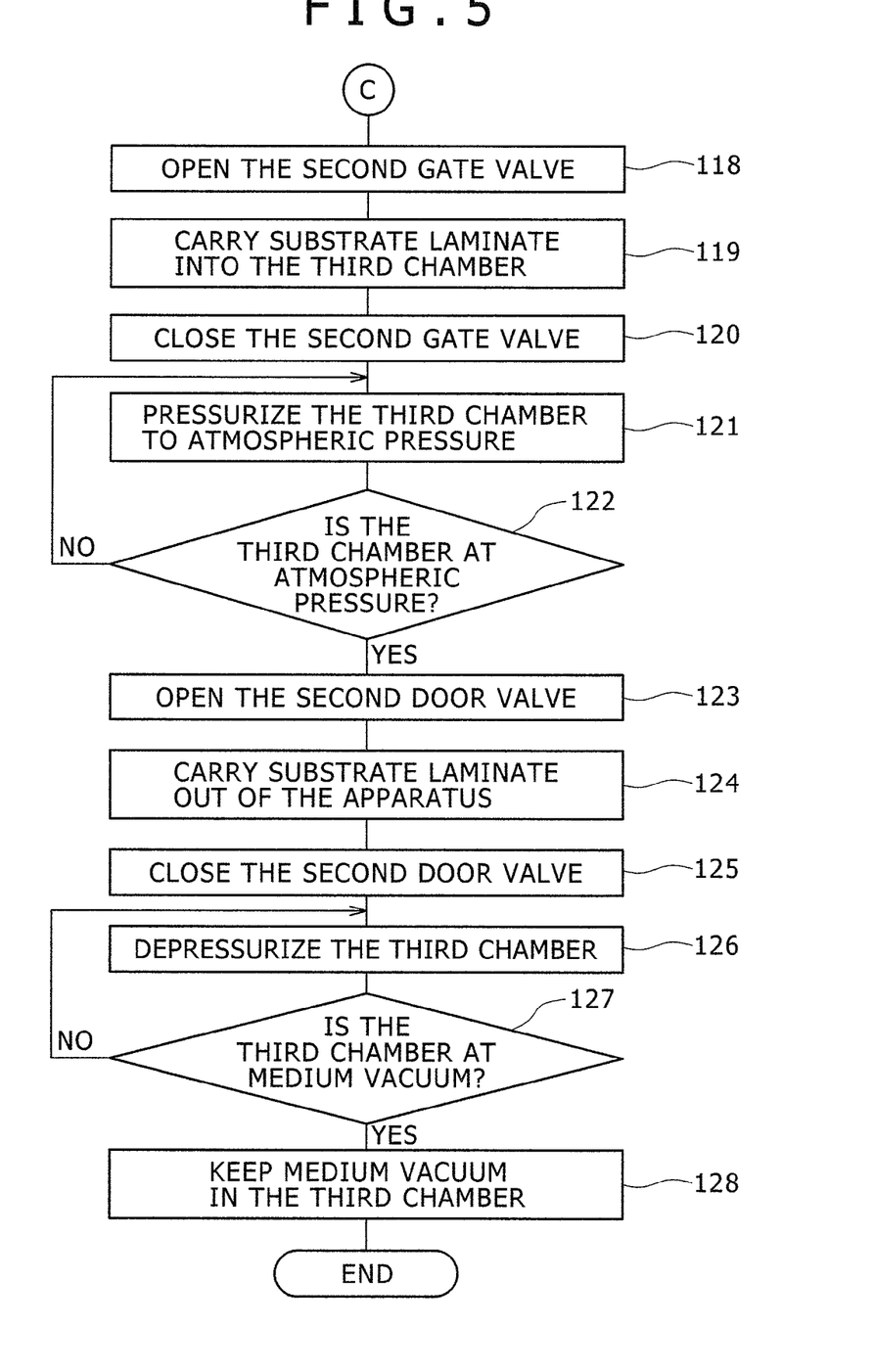
FIG. 5 is a flowchart which shows steps next to those in FIG. 4 in the operation sequence of the substrate laminating apparatus.

FIGS. 3 to 5 are flowcharts for the substrate laminating sequence according to the present invention.

First, for the upper and lower substrate carrying robot hands R1 and R2 in the first chamber to receive the upper and lower substrates 30 and 31 to be stuck together, the first door valve 2 at the entry of the first chamber C1 is opened (Step 100). Next, the vacuum pump 7 is started and cross valves V1 and V2 are operated to supply a negative pressure to the substrate holding area of each substrate carrying robot hand. Then, the upper substrate 30 is held on the upper substrate carrying robot hand R1 by suction and adsorption and carried into the first chamber (Step 101). Similarly, the lower substrate 31 is held on the lower substrate carrying robot hand R2 by suction and adsorption and carried into the first chamber (Step 102). After the upper and lower substrates have been carried into the first chamber, the first door valve 2 is closed (Step 103). Upon closing of the first door valve 2, the vacuum pump 6 is started to depressurize the first chamber C1 until medium vacuum is reached (Steps 104 and 105).

Since the substrates are held in place by suction and adsorption in the first chamber, there are always minute leaks which take away gas from the chamber. For this reason, the same quantity of nitrogen as the gas taken away is supplied through a valve NV1 to keep a constant medium vacuum condition. In the first to third chambers, when substrates are held in place by suction and adsorption in medium vacuum, there are always minute leaks and thus the valves NV1 to NV3 are opened and closed to turn on and off nitrogen so as to keep the inner pressure of each chamber constant.

While the first chamber C1 is evacuated to reach medium vacuum, the second chamber is at medium vacuum. Or it may be that during evacuation of the first chamber, substrates carried in previously are being stuck together in high vacuum or a finished substrate laminate (liquid crystal panel) is being delivered (in this case, the second and third chambers are both at medium vacuum). The explanation of this embodiment given here assumes that the second chamber is in the standby state and no substrates exist there.

When the first chamber reaches medium vacuum, the first gate valve 3 is opened (Step 106). As the first gate valve 3 opens, the upper or lower substrate carrying robot hand, R1 or R2, holding the upper or lower substrate, is activated to put the upper or lower substrate, 30 or 31, onto the upper table 9 or lower table 8 in the second chamber C2 respectively. Plural electrostatic adsorption means 25 are located on the upper table 9 in a way to be able to move up and down with respect to the upper table surface. When the movable electrostatic adsorption means 25 pick up the upper substrate from the upper substrate carrying robot hand R1, the electrostatic adsorption means 25 descend to let their electrostatic adsorption surfaces touch or come close to the upper substrate's holding surface and hold it by adsorption; the robot hand R1, by opening the cross valve V1 to communicate with the chamber, releases the suction/adsorption force to allow the electrostatic adsorption means 25 to pick up the substrate and retracts. Then, the movable electrostatic adsorption means 25 move up to become flush with the upper table 9 surface. After the movable electrostatic adsorption means 25 become flush with the upper table surface, the substrate holding means 17 for fixation on the upper table 9 is activated to fix the upper substrate 30 on the upper table 9 surface. At this time, the movable electrostatic adsorption means 25 retain their electrostatic force. Likewise, the lower substrate carrying robot hand R2 is activated to bring the lower substrate 31 on it to over the lower table 8 surface. The substrate lifter 19 for the lower table 8 ascends and receives the lower substrate 31 from the lower substrate carrying robot hand R2. Then, the upper and lower substrate carrying robots, R1 and R2, move back into the first chamber and the substrate lifter 19 descends so as to let the lower substrate 31 rest on the lower table 8 surface. The first gate valve 3 is closed (Step 109). At this time, the vacuum pump is started and the cross valve V4 is opened to a position which allows supply of a negative pressure to the lower table 8 through the plural suction/adsorption holes in the lower table 8 surface so that the lower substrate 31 is held on the lower table surface by suction and adsorption. Then, the chuck 18 for holding a substrate in vacuum which consists of electrostatic adsorption means or adhesive adsorption means is activated to fix the lower substrate 31 on the lower table 8 surface. Needless to say, it is also possible that the upper and lower substrates are carried into the second chamber simultaneously.

After the above steps have been taken, as shown in FIG. 4, the first door valve 2 for the first chamber C1 is opened (Step 110) to return the pressure level in the first chamber C1 from medium vacuum to atmospheric pressure (Step 111) and the first chamber C1 stands by for next substrates. In the second chamber C2, the upper and lower substrates are roughly positioned (Step 112). In positioning the upper and lower substrates, plural positioning marks previously made on the substrates are observed through plural cameras (not shown) and an alignment error is calculated and the lower table 8 is moved horizontally for adjustment. The drive means for the lower table 8, including frictional sliding parts, is located outside the second chamber C2. The connecting shaft on the lower table 8 is connected the drive through an elastic body such as bellows so as to keep the vacuum in the second chamber.

Next, while the second chamber inside is at medium vacuum, the vacuum pump 10 and turbo molecular pump 11 are activated to reach a higher vacuum level (Step 113). Whether the degree of vacuum in the second chamber is sufficient for laminating work is decided (Step 114) and if the vacuum is sufficiently high, the upper and lower substrates are positioned precisely (Step 115). Then, the upper table 9 is moved down toward the lower table 8 under control and pressure is applied to laminate them while the pressure or the spacing between the substrates is being measured (Step 116). In the course of this laminating work (pressure application), precision positioning is carried out several times under control. Once a prescribed pressing force or a prescribed inter-substrate spacing is reached, pressure application is ended.

Although the upper table 9 is moved up and down for lamination in the abovementioned sequence, obviously it is also possible that the upper table 9 is fixed and the lower table 8 is moved up for lamination.

After the lamination process under pressure is finished, the areas of adhesive agent for temporary fixation are irradiated with UV rays to fix the substrate laminate temporarily (Step 117). Instead, this temporary fixation step may be taken in the third chamber C3 later after the step of releasing the vacuum to the atmospheric pressure (Step 122). Then, the upper table 9 moves up. Next, nitrogen gas for purging is introduced into the second chamber and pressurization is done until medium vacuum is reached. Whether the second chamber is at medium vacuum is decided and as medium vacuum is reached, the second gate valve 4 is opened (Step 118 in FIG. 5).

Then, the substrate lifter 19 is activated in the second chamber to lift the finished substrate laminate (liquid crystal panel) from the lower table 8 surface. Then, the laminate delivery robot hand R3 is activated in the third chamber and expanded to a laminate pickup point. As the laminate (liquid crystal panel) is put on the delivery robot hand R3, the vacuum pump 15 is started to fix the laminate on the delivery robot hand. Then, the delivery robot hand contracts and carries the laminate into the third chamber (Step 119). After the laminate has been carried into the third chamber, the second gate valve 4 is closed (Step 120) and nitrogen as a purge gas is introduced to pressurize the chamber to the atmospheric pressure (Step 121). When a temporary fixation step has not been taken in vacuum, UV radiation takes place for temporary fixation at this step. Then the second door valve 5 is opened (Step 123) and the laminate is carried out of the third chamber and sent to the next manufacturing stage (Step 124). After the laminate has been carried out of the third chamber, the second door valve is closed (Step 125). Then the vacuum pump 16 is started to depressurize the third chamber until medium vacuum is reached (Step 126). Whether the vacuum chamber is at medium vacuum is decided (Step 127) and if it is at medium vacuum, the third chamber is kept at medium vacuum (Step 128).

Although the apparatus carries out the above steps in the above order, instead, by activating the first gate valve 3 and second gate valve 4, carrying the substrates into the second chamber, and delivering the laminate almost simultaneously, the substrate lamination time can be substantially reduced. In this process, the degree of vacuum in the first to third chambers is medium vacuum, which means a condition in which substrates can be held by suction and adsorption. In other words, the degree of vacuum for suction and adsorption is such that a negative pressure for high vacuum can be supplied.

As explained so far, according to the present invention, the pressure level in the first chamber and third chamber is varied from atmospheric pressure to medium vacuum under control and that in the second chamber is varied from medium vacuum to high vacuum under control. This remarkably reduces time required to evacuate the chambers. In addition, since nitrogen is introduced for purging, there is no influence of moisture even when the degree of vacuum is varied, thereby eliminating the need for a large-capacity turbo molecular pump and contributing to apparatus size reduction. Furthermore, when the upper table picks up the upper substrate from the robot hand in the second chamber at medium vacuum, the electrostatic adsorption means with means for vertical motion are used so that the upper substrate is picked up and pulled up to the upper table surface reliably. Besides, since adsorption means for holding (electrostatic adsorption means or adhesive adsorption means) are provided on the upper table, the substrate is firmly held even in high vacuum by the electrostatic adsorption means for pickup and the adsorption means for holding.

What is claimed is:

1. A substrate laminating apparatus comprising:
a first chamber including an upper substrate carrying robot arm for carrying in an upper substrate and a lower substrate carrying robot arm for carrying in a lower substrate, in which the upper substrate carrying robot arm is configured to hold a surface of the upper substrate by suction and adsorption, and the lower substrate carrying robot arm is configured to hold a surface of the lower substrate by suction and adsorption;
a vacuum pump which changes the first chamber inner condition from atmospheric pressure to medium vacuum;
a second chamber including
movable electrostatic adsorption means located on an upper table in a way to be able to move up and down,
holding electrostatic adsorption means fixed on a surface of the upper table,
in which the upper table has at least one recess to permit an electrostatic absorption surface of the movable electrostatic adsorption means to become flush with the surface of the upper table, the movable electrostatic adsorption means being configured to move down from the recess of the upper table, pick up an upper substrate by electrostatic adsorption from the upper substrate carrying robot arm in medium vacuum, move up to the recess of the upper table surface to hold the upper substrate by electrostatic adsorption on the upper table surface,
in which the holding electrostatic adsorption means is configured to hold the upper substrate by electrostatic adsorption on the upper table surface so when the movable electrostatic adsorption means ascends a holding surface of the upper substrate touches the upper table surface, and after the movable electrostatic adsorption means become flush with the upper table surface, the holding electrostatic absorption means for fixation the upper table is activated to fix the upper substrate on the on the upper table surface, wherein the movable electrostatic adsorption means retain their electrostatic force such that the electrostatic forces of both the movable electrostatic adsorption and the holding electrostatic adsorption means are active at the point in time when the movable electrostatic adsorption means is flush with the upper table surface, and a lower table has a lifting pin for receiving a lower substrate from the lower substrate carrying robot arm and placing it on the lower table surface, and holding means for holding a lower substrate by electrostatic adsorption on the lower table surface, and either of the upper and lower tables moves horizontally to align an upper substrate and a lower substrate and either of the upper and lower tables moves up or down to decrease the spacing between substrates and stick them together to form a substrate laminate;
a first gate valve located between the first chamber and the second chamber and connects the first chamber to the second chamber so as to enable transfer of the upper and lower substrates from the first chamber to the second chamber in the medium vacuum;
a third chamber including a robot arm for carrying out the substrate laminate from the second chamber into the third chamber in the medium vacuum, and in which the substrate laminate is carried out of the third chamber at atmospheric pressure;
measuring means which are located in the first chamber, second chamber and third chamber to measure pressures in the chambers; and
control means for controlling the degrees of vacuum in the chambers;
a second gate valve is located between the second chamber and the third chamber and connects the second chamber and the third chamber to enable transfer of the substrate laminate from the second chamber to the third chamber in the medium vacuum;
and when the first chamber reaches medium vacuum the first gate valve opens, as the first gate valve opens, the upper and lower substrate carrying robot hands are activated to simultaneously carry the upper and lower substrates into the second chamber and to put the upper and lower substrates on to the upper table and lower table respectively in the medium vacuum.

2. The substrate laminating apparatus according to claim 1, further comprising a vacuum pump for holding substrates on the upper substrate carrying robot arm and the lower substrate carrying arm by suction and adsorption while the first to third chambers are in an atmospheric pressure to medium vacuum condition.

3. The substrate laminating apparatus according to claim 1, wherein during substrate laminate transportation from the second chamber to the third chamber, the inside of the second and third chambers are kept at medium vacuum in order to prevent misalignment of an upper substrate and a lower substrate which have been stuck together as the substrate laminate.

4. A substrate laminating apparatus comprising:
a substrate input chamber including:
an upper substrate carrying robot arm configured to hold a surface of an upper substrate by suction and adsorption;
a lower substrate carrying robot arm configured to hold a surface of a lower substrate by suction and adsorption; and
a vacuum pump for depressurizing the substrate input chamber to a pressure level varied between atmospheric pressure and medium vacuum;
a vacuum laminating chamber connected to the substrate input chamber through a first gate valve, the vacuum laminating chamber including:
an upper table having at least one recess in a lower surface thereof; a movable electrostatic adsorption electrode able to move between a position within the at least one recess so that a lower surface of the movable electrostatic adsorption electrode is flush with the lower surface of the upper table and a position in which the lower surface of the movable electrostatic adsorption electrode protrudes downwardly from the lower surface of the upper table, wherein the movable electrostatic adsorption electrode is configured to move down from the at least one recess of the upper table, pick up an upper substrate by electrostatic adsorption from the upper substrate carrying robot arm in medium vacuum, move up to the at least one recess of the lower surface of the upper table to hold the upper substrate by electrostatic adsorption on the upper table surface; and a holding electrostatic adsorption unit to hold the upper substrate by electrostatic adsorption on the upper table surface, so when the movable electrostatic adsorption means ascends a holding surface of the upper substrate touches the upper table surface; after the movable electrostatic adsorption means become flush with the upper table surface, the holding electrostatic absorption means for fixation the upper table is activated to fix the upper substrate on the on the upper table surface, wherein the movable electrostatic adsorption means retain their electrostatic force such that the electrostatic forces of both the movable electrostatic adsorption and the holding electrostatic adsorption means are active at the point in time when the movable electrostatic adsorption means is flush with the upper table surface;

a lower table having an electrostatic adsorption unit for holding the lower substrate by electrostatic adsorption on an upper surface of the lower table; wherein at least one of the upper and lower tables is movable horizontally to align the upper substrate and the lower substrate and at least one of the upper and lower tables is movable vertically to decrease a spacing between the upper and lower substrates and stick them together to form a substrate laminate; and a vacuum pump for depressurizing the vacuum laminating chamber to a pressure level varied between medium vacuum and high vacuum; and a substrate delivery chamber connected to the vacuum laminating chamber through a second gate valve, the substrate delivery chamber including:
  a robot arm for holding laminated upper and lower substrates by suction and adsorption and carrying laminated upper and lower substrates from the vacuum laminating chamber and into the substrate delivery chamber; and
  a vacuum pump for depressurizing the substrate delivery chamber to a pressure level varied between atmospheric pressure and medium vacuum,
  and when the substrate input chamber reaches medium vacuum the first gate valve opens, as the first gate valve opens, the upper and lower substrate carrying robot hands are activated to simultaneously carry the upper and lower substrates into the vacuum laminating chamber and to put the upper and lower substrates on to the upper table and lower table respectively in the medium vacuum.

5. The substrate laminating apparatus according to claim 1, wherein the second chamber further comprising a vacuum pump and a turbo molecular pump, so when activated, change the inner condition in the second chamber from the medium vacuum to a high vacuum level, during a lamination process.

6. The substrate laminating apparatus according to claim 5, wherein the second chamber further comprising a plurality of valves, so when opened, introduce nitrogen gas for purging into the second chamber to return the inner condition in the second chamber form the high vacuum back to the medium vacuum, after the lamination process is completed.

* * * * *